United States Patent Office.

SMITH GARDNER, OF NEW YORK, N. Y.

Letters Patent No. 69,985, dated October 22, 1867.

IMPROVED PROCESS OF ORNAMENTING MARBLE.

*The Schedule referred to in these Letters Patent and making part of the same.*

Be it known that I, SMITH GARDNER, of the city, county, and State of New York, have invented a new and useful Process of Ornamenting Marble and other stones, by permeating them with chemical liquids, for purposes of ornamentation, such as coloring or staining, or decoloring, clouding, or otherwise, in various hues; and I do hereby describe and ascertain my said invention as follows:

Heretofore it has been attempted to permeate stone, and especially porous sandstones, with certain materials that shall protect them from the action of the weather, and it has also been suggested to so treat marble statuary, &c., in like manner, and then to paint the surface thereof, a process too obviously objectionable to be pointed out. My device and its purposes are of a different nature. Instead of injuring or marring the materials I act upon, I take the most common and cheapest marbles and other stones, and by a process of ornamenting, by permeating them with one or more colors, I render them in all respects as beautiful as, and equal to the most costly stones of like structure, and that so perfectly as to render the stone undistinguishable from the original types, and consequently as valuable.

To effect this, I enclose the block to be acted on in a tight tank or cistern, filled with the proper solution to give the color desired, said cistern being of sufficient strength to resist the heavy pressure required for the operation. Heavy pressure is then brought to bear upon the fluid by a hydrostatic pump or other proper apparatus, sufficient to cause the coloring matter to permeate the stone. If it is desired to variegate the surface, or apply different coloring matter to different parts, I "stop out" those parts I do not desire to act upon, as is done by the well-known processes of the engraver.

The time required properly to saturate the stone depends upon the thickness and texture of the pieces operated on and the amount of pressure applied. The saturation may be facilitated and more effectually accomplished by first expelling the air, as far as practicable, from the pores of the stone by means of heat or otherwise.

By this treatment marble and some other stones may be permanently and beautifully colored of any desired hue or shade.

Having thus fully described my improvements in coloring stones for ornamental purposes, and thus increasing their value, I wish it to be understood that I do not claim permeating stone for the purpose of increasing its durability, as that has before been essayed; but what I do claim, and for which I desire to secure Letters Patent, is—

Permeating pieces of marble and other stone with coloring chemical fluids that will change the color of said stone, substantially as and for the purposes herein set forth.

SMITH GARDNER.

Witnesses:
STEPHEN CLARK,
J. J. GRENOUGH.